US011820367B2

(12) United States Patent
Omori (10) Patent No.: US 11,820,367 B2
(45) Date of Patent: *Nov. 21, 2023

(54) TURNING CONTROLLER FOR VEHICLE, COMPUTER-READABLE MEDIUM STORING TURNING CONTROL PROGRAM, AND TURNING CONTROL METHOD FOR VEHICLE

(71) Applicants: ADVICS CO., LTD., Kariya (JP); DENSO CORPORATION, Kariya (JP); AISIN CORPORATION, Kariya (JP); JTEKT CORPORATION, Kariya (JP); J-QuAD DYNAMICS INC., Tokyo (JP)

(72) Inventor: Yosuke Omori, Kariya (JP)

(73) Assignee: J-QUAD DYNAMICS INC., Tokyo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 17/476,100

(22) Filed: Sep. 15, 2021

(65) Prior Publication Data

US 2022/0089150 A1 Mar. 24, 2022

(30) Foreign Application Priority Data

Sep. 23, 2020 (JP) .................................. 2020-158530

(51) Int. Cl.
  *B60W 30/09* (2012.01)
  *B62D 7/15* (2006.01)
  (Continued)

(52) U.S. Cl.
  CPC ............ *B60W 30/09* (2013.01); *B60W 10/04* (2013.01); *B60W 10/18* (2013.01); *B60W 10/20* (2013.01);
  (Continued)

(58) Field of Classification Search
  CPC ...... B60W 30/09; B60W 10/04; B60W 10/18; B60W 10/20; B60W 50/0097;
  (Continued)

(56) References Cited

U.S. PATENT DOCUMENTS 5,627,754 A * 5/1997 Asanuma ............... B62D 7/159
  180/408
2007/0010945 A1* 1/2007 Shoda ..................... G08G 1/163
  340/436

(Continued)

FOREIGN PATENT DOCUMENTS

CN 105026237 A * 11/2015
CN 107839683 A * 3/2018
(Continued)

OTHER PUBLICATIONS

Office Action (First Office Action Notification) dated Apr. 14, 2023, by the State Intellectual Property Office of People's Republic of China in corresponding Chinese Patent Application No. 202111080002.2 and an English translation of the Office Action. (14 pages).

(Continued)

*Primary Examiner* — B M M Hannan (57) ABSTRACT

A turning controller for a vehicle is configured to execute: a time obtaining process that obtains collision prediction time; a lateral movement amount determining process that determines whether a target lateral movement amount is greater than or equal to a lateral movement amount determination value; and an automatic turning process that, in a case in which the collision prediction time is shorter than or equal to a determination prediction time, outputs a command for steering the front wheel to the front wheel steering device and outputs a command for steering the rear wheel to the rear wheel steering device, in order to avoid a collision between the vehicle and the obstacle; a counter-phase process in the automatic turning process in a case in which the (Continued)

target lateral movement amount is determined to be greater than or equal to the lateral movement amount determination value.

6 Claims, 5 Drawing Sheets

(51) Int. Cl.
*B62D 15/02* (2006.01)
*B60W 10/20* (2006.01)
*B60W 10/04* (2006.01)
*B60W 50/00* (2006.01)
*B60W 10/18* (2012.01)

(52) U.S. Cl.
CPC ......... *B60W 50/0097* (2013.01); *B62D 7/159* (2013.01); *B62D 15/0265* (2013.01); *B60W 2520/14* (2013.01); *B60W 2710/18* (2013.01); *B60W 2710/20* (2013.01)

(58) Field of Classification Search
CPC ......... B60W 2520/14; B60W 2710/18; B60W 2710/20; B60W 2720/14; B60W 10/184; B60W 30/045; B60W 2554/802; B60W 2554/804; B60W 30/0956; B60W 40/101; B60W 30/08; B60W 2420/42; B60W 2520/10; B60W 2520/105; B60W 2520/125; B62D 7/159; B62D 15/0265; B60Y 2400/84
USPC .......................................................... 701/26
See application file for complete search history.

(56) References Cited

U.S. PATENT DOCUMENTS

| | | | |
|---|---|---|---|
| 2018/0178782 A1* | 6/2018 | Saiki | B60W 30/09 |
| 2018/0178783 A1* | 6/2018 | Saiki | B60W 30/0956 |
| 2019/0061743 A1* | 2/2019 | Ozawa | B60W 10/20 |
| 2019/0184978 A1 | 6/2019 | Park et al. | |
| 2021/0171022 A1* | 6/2021 | Tsuchiya | B60W 10/18 |
| 2022/0289174 A1* | 9/2022 | Hashimoto | B60W 10/18 |

FOREIGN PATENT DOCUMENTS

| | | | |
|---|---|---|---|
| CN | 109591813 A | * | 4/2019 |
| CN | 109641590 A | * | 4/2019 |
| JP | 2007-253770 A | | 10/2007 |
| JP | 2009280102 A | * | 12/2009 |
| JP | 2010042692 A | * | 2/2010 |
| JP | 2010214988 A | * | 9/2010 |
| JP | 5227082 B2 | | 7/2013 |
| JP | 2017-081232 A | | 5/2017 |
| JP | 2017226340 A | | 12/2017 |
| JP | 6423822 B2 | | 11/2018 |
| JP | 2019185639 A | * | 10/2019 |
| KR | 20200017971 A | * | 2/2020 |
| KR | 20210127267 A | * | 10/2021 |
| WO | WO-2021005940 A1 | * | 1/2021 |
| WO | WO-2021059670 A1 | * | 4/2021 |

OTHER PUBLICATIONS

Office Action issued by the U.S. Patent and Trademark Office in U.S. Appl. No. 17/465,107, dated Jul. 14, 2023, U.S. Patent and Trademark Office, Alexandria, VA. (13 pages).

* cited by examiner

TURNING CONTROLLER FOR VEHICLE, COMPUTER-READABLE MEDIUM STORING TURNING CONTROL PROGRAM, AND TURNING CONTROL METHOD FOR VEHICLE

BACKGROUND

1. Field

The present disclosure relates to a turning controller for a vehicle, a computer-readable medium storing a turning control program, and a turning control method for a vehicle.

2. Description of Related Art

Japanese Laid-Open Patent Publication No. 2017-226340 discloses an example of a turning assist device that assists turning of a vehicle when a driver performs a steering operation under a situation in which an obstacle exists in the path of the vehicle. This turning assist device performs an in-phase control, which steers the rear wheels in the same direction as the front wheels, which are steered in accordance with a steering operation by the driver.

In recent years, an automatic turning control has been developed that automatically causes a vehicle to turn without a driver's steering operation, so as to avoid a collision with an obstacle in the path of the vehicle. Such an automatic turning control is designed to avoid collision between a vehicle and an obstacle in an emergency. Thus, it is preferable not to perform the automatic turning control when a collision between a vehicle and an obstacle can be avoided without performing the automatic turning control. In order to allow the automatic turning control to be performed less frequently, it is necessary to quickly increase the amount of lateral movement of the vehicle caused by the performance of the automatic turning control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a turning controller for a vehicle is provided. The vehicle includes wheels including a front wheel and a rear wheel, a front wheel steering device configured to adjust a steered angle of the front wheel, and a rear wheel steering device configured to adjust a steered angle of the rear wheel. The turning controller includes processing circuitry configured to execute: a time obtaining process that obtains collision prediction time, the collision prediction time being a predicted value of an amount of time before the vehicle collides with an obstacle in a case in which the vehicle is approaching the obstacle; a lateral movement amount determining process that determines whether a target lateral movement amount is greater than or equal to a lateral movement amount determination value, the target lateral movement amount being a movement amount in a lateral direction of the vehicle required to avoid a collision between the vehicle and the obstacle; and an automatic turning process in a case in which the collision prediction time is shorter than or equal to a determination prediction time, the automatic turning process outputting a command for steering the front wheel to the front wheel steering device and outputting a command for steering the rear wheel to the rear wheel steering device, in order to avoid a collision between the vehicle and the obstacle. The processing circuitry is configured to execute a counter-phase process in the automatic turning process in a case in which the target lateral movement amount is determined to be greater than or equal to the lateral movement amount determination value. The counter-phase process outputs a command for steering the rear wheel in a direction opposite to a steering direction of the front wheel to the rear wheel steering device.

In a situation in which a vehicle is approaching an obstacle located forward of the vehicle, the above-described configuration executes the automatic turning process to avoid a collision between the vehicle and the obstacle when the collision prediction time becomes shorter than or equal to the determination prediction time. A case in which the target lateral movement amount is large refers to a case in which the vehicle needs to move in the lateral direction by a large amount in order to avoid a collision with an obstacle. Thus, when the target lateral movement amount is determined to be greater than or equal to the lateral movement amount determination value, the counter-phase process is executed to steer the rear wheel in a direction opposite to the steering direction of the front wheel. This increases the amount of lateral movement of the vehicle caused by the execution of the automatic turning process.

In another aspect, a non-transitory computer readable medium storing a turning control program executed by a controller for a vehicle is provided. The vehicle includes wheels including a front wheel and a rear wheel, a front wheel steering device configured to adjust a steered angle of the front wheel, and a rear wheel steering device configured to adjust a steered angle of the rear wheel. The turning control program is configured to cause the controller to execute: a time obtaining process that obtains collision prediction time, the collision prediction time being a predicted value of an amount of time before the vehicle collides with an obstacle in a case in which the vehicle is approaching the obstacle; a determining process that determines whether a target lateral movement amount is greater than or equal to a lateral movement amount determination value, the target lateral movement amount being a movement amount in a lateral direction of the vehicle required to avoid a collision between the vehicle and the obstacle; and a counter-phase automatic turning process that, in a case in which the collision prediction time is shorter than or equal to a determination prediction time and the target lateral movement amount is determined to be greater than or equal to the lateral movement amount determination value, outputs a command for steering the front wheel to the front wheel steering device and outputs a command for steering the rear wheel in a direction opposite to a steering direction of the front wheel to the rear wheel steering device, in order to avoid a collision between the vehicle and the obstacle.

In a further aspect, a turning control method for a vehicle is provided. The vehicle includes wheels including a front wheel and a rear wheel, a front wheel steering device configured to adjust a steered angle of the front wheel, and a rear wheel steering device configured to adjust a steered angle of the rear wheel. The turning control method includes: obtaining collision prediction time, the collision prediction time being a predicted value of an amount of time before the vehicle collides with an obstacle in a case in which the vehicle is approaching the obstacle; determining whether a target lateral movement amount is greater than or equal to a lateral movement amount determination value, the target lateral movement amount being a movement amount in a lateral direction of the vehicle required to avoid a collision between the vehicle and the obstacle; and in a case in which the collision prediction time is shorter than or equal to a determination prediction time and the target lateral movement amount is determined to be greater than or equal to the lateral movement amount determination value, outputting a command for steering the front wheel to the front wheel steering device and outputting a command for steering the rear wheel in a direction opposite to a steering direction of the front wheel to the rear wheel steering device, in order to avoid a collision between the vehicle and the obstacle.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle turning controller according to one embodiment will now be described with reference to FIGS. 1 to 8.

Figure 1:
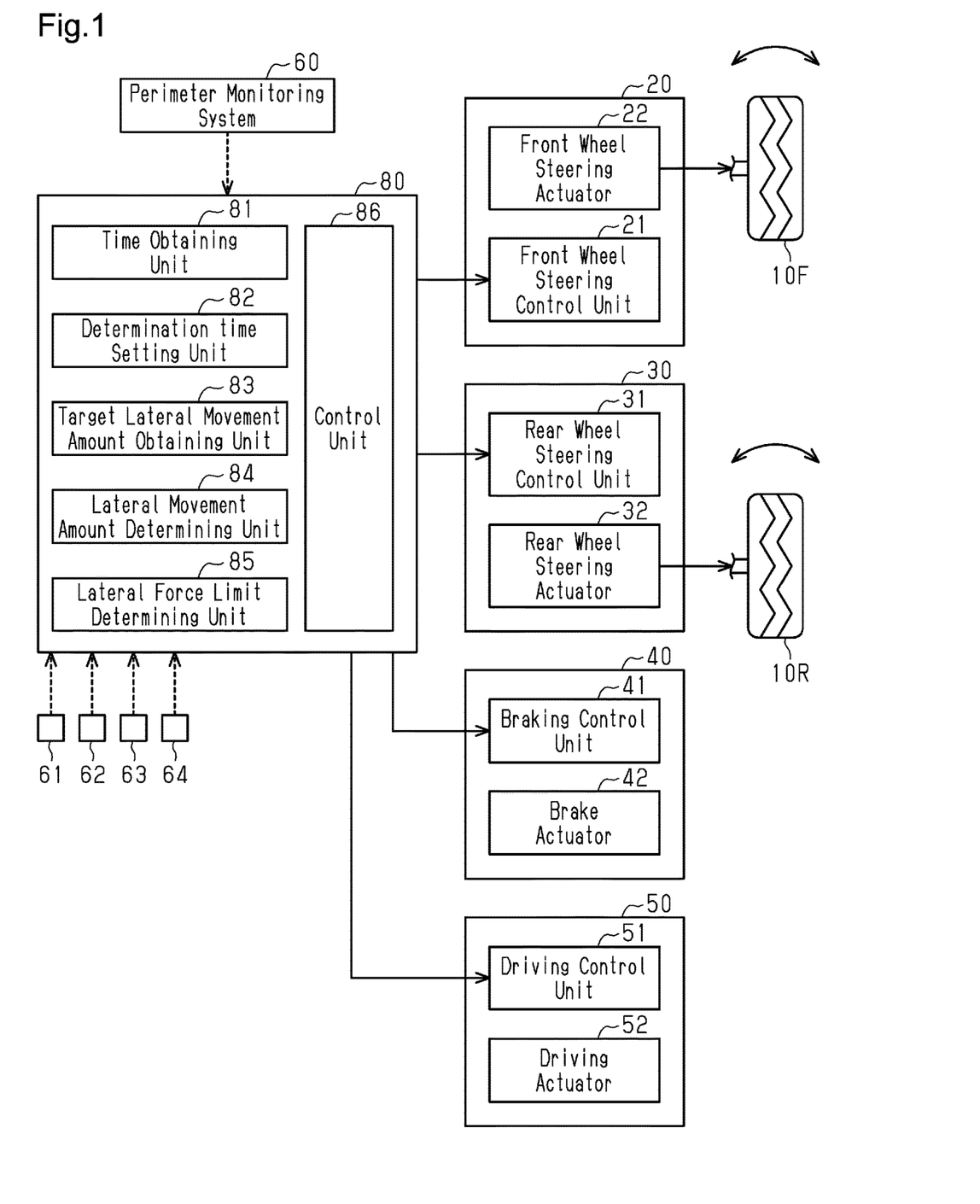
FIG. 1 is a diagram showing a function configuration of an integrated controller, which is a vehicle turning controller according to one embodiment, and a schematic configuration of a vehicle equipped with the integrated controller.

FIG. 1 shows a vehicle equipped with an integrated controller 80, which is one example of the turning controller. The vehicle includes wheels 10F and 10R, a front wheel steering device 20, and a rear wheel steering device 30. In the present embodiment, the vehicle includes front wheels 10F, which include a right front wheel and a left front wheel, and rear wheels 10R, which include a right rear wheel and a left rear wheel.

The front wheel steering device 20 includes a front wheel steering control unit 21 and a front wheel steering actuator 22. The front wheel steering control unit 21 controls operation of the front wheel steering actuator 22 so as to adjust the steered angle of the front wheels 10F.

The rear wheel steering device 30 includes a rear wheel steering control unit 31 and a rear wheel steering actuator 32. The rear wheel steering control unit 31 controls operations of the rear wheel steering actuator 32 so as to adjust the steered angle of the rear wheels 10R.

The front wheel steering control unit 21 and the rear wheel steering control unit 31 may have any one of the following configurations (a) to (c).

(a) Circuitry including one or more processors that execute various processes according to computer programs. The processor includes a CPU and a memory such as RAM and ROM. The memory stores program codes or instructions configured to cause the CPU to execute processes. The memory, which is a computer-readable medium, includes any type of media that are accessible by general-purpose computers and dedicated computers.

(b) Circuitry including one or more dedicated hardware circuits that execute various processes. The dedicated hardware circuits include, for example, an application specific integrated circuit (ASIC) and a field programmable gate array (FPGA).

(c) Circuitry including a processor that executes part of various processes according to programs and a dedicated hardware circuit that executes the remaining processes.

The vehicle further includes a braking device 40 and a driving device 50.

The braking device 40 includes a braking control unit 41 and a brake actuator 42. The braking control unit 41 controls operations of the brake actuator 42 so as to adjust braking force applied to the respective wheels 10F, 10R.

The driving device 50 includes a driving control unit 51 and a driving actuator 52. The driving actuator 52 includes drive sources of the vehicle such as an engine and/or an electric motor, and a driving force transmitting device, which transmits driving force output from the drive sources to wheels. For example, if the vehicle is a front-wheel drive vehicle, the driving force output from the drive source is distributed to the front wheels 10F via the driving force transmitting device. Operation of the driving actuator 52 is controlled by the driving control unit 51.

The braking control unit 41 and the driving control unit 51 may have any one of the above-described configurations (a) to (c).

The vehicle includes a perimeter monitoring system 60, which monitors the perimeters of the vehicle. The perimeter monitoring system 60 includes image pickup devices such as cameras and radars. The perimeter monitoring system 60 monitors the number and the positions of other vehicles located around the vehicle and whether there is an obstacle in the path of the host vehicle. Obstacles in this description refer to objects of such sizes that collision with the vehicle needs to be avoided. Obstacles may include other vehicles, guardrails, and pedestrians.

The vehicle includes various types of sensors. The sensors may include a vehicle speed sensor 61, a longitudinal acceleration sensor 62, a lateral acceleration sensor 63, and a yaw rate sensor 64. The vehicle speed sensor 61 detects a vehicle speed Vxe, which is a moving speed in the longitudinal direction of the vehicle, and outputs a detection signal corresponding to the detection result to the integrated controller 80. The longitudinal acceleration sensor 62 detects a longitudinal acceleration Axe, which is an acceleration in the longitudinal direction of the vehicle, and outputs a detection signal corresponding to the detection result to the integrated controller 80. The lateral acceleration sensor 63 detects a lateral acceleration Aye, which is an acceleration in the lateral direction of the vehicle, and outputs a detection signal corresponding to the detection result to the integrated controller 80. The yaw rate sensor 64 detects a yaw rate $\gamma$ of the vehicle, and outputs a detection signal corresponding to the detection result to the integrated controller 80.

Based on information obtained by the perimeter monitoring system 60 and the detection signals from the sensors 61 to 64, the integrated controller 80 outputs commands for causing the vehicle to travel autonomously to the front wheel steering control unit 21, the rear wheel steering control unit 31, the braking control unit 41, and the driving control unit 51.

The integrated controller 80, which is processing circuitry, may have any one of the above-described configurations (a) to (c). In the present embodiment, the integrated controller 80 includes a CPU, ROM, and a memory device. The ROM stores control programs executed by the CPU. The memory device stores values calculated when the CPU executes the control programs. That is, the ROM stores a turning control program, which is needed in control for avoiding collision between the vehicle and an obstacle. Thus, the integrated controller 80 corresponds to a controller that executes the turning control program.

In the present embodiment, the integrated controller 80 includes, as functional units, a time obtaining unit 81, a determination time setting unit 82, a target lateral movement amount obtaining unit 83, a lateral movement amount determining unit 84, a lateral force limit determining unit 85, and a control unit 86.

Figure 3:
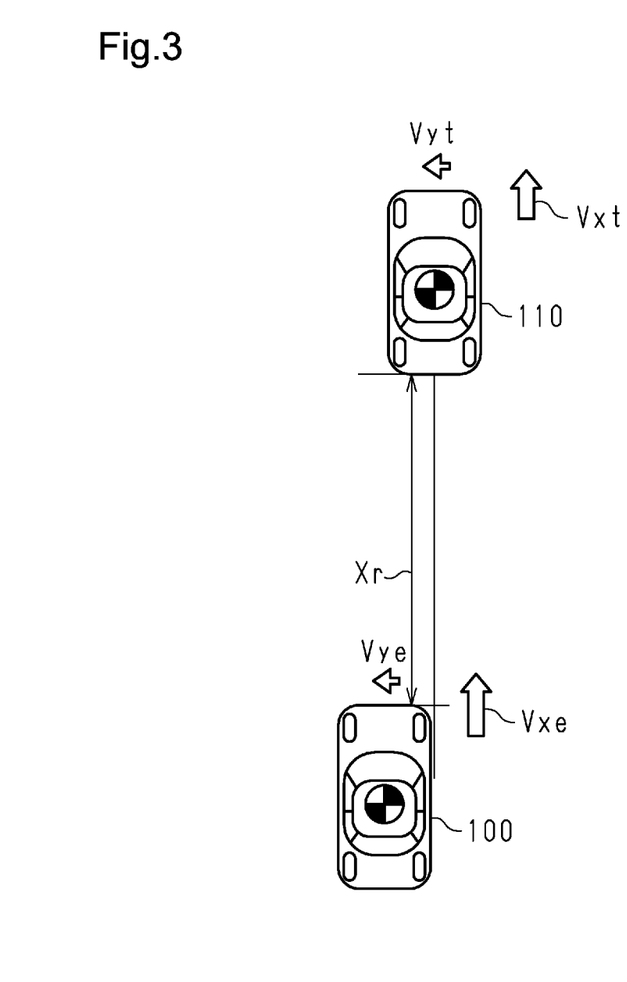
FIG. 3 is a schematic diagram showing a situation in which an obstacle exists in the path of a vehicle.

An example shown in FIG. 3 assumes that a vehicle 100 is approaching an obstacle 110, which is located forward of the vehicle 100. The time obtaining unit 81 obtains collision prediction time TMx, which is a predicted value of an amount of time before the vehicle 100 collides with the obstacle 110. A method for obtaining the collision prediction time TMx will be described later.

The determination time setting unit 82 sets determination prediction time TMxTh. The determination prediction time TMxTh is a determination value for determining a point in time at which an automatic turning control is started based on the collision prediction time TMx. The automatic turning control is designed to avoid collision between the vehicle 100 and the obstacle 110. A method for setting the determination prediction time TMxTh will be described later.

The target lateral movement amount obtaining unit 83 obtains a target lateral movement amount YmTr, which is a movement amount in the lateral direction of the vehicle 100 required to avoid a collision between the vehicle 100 and the obstacle 110. A method for setting the target lateral movement amount YmTr will be described later.

The lateral movement amount determining unit 84 determines whether the target lateral movement amount YmTr is greater than or equal to a lateral movement amount determination value YmTh. As will be described in detail below, the automatic turning control executes an in-phase process or a counter-phase process. The lateral movement amount determination value YmTh is used as a reference for determining which of the in-phase process or the counter-phase process should be executed. The lateral movement amount determination value YmTh is set to a value that can be used to determine whether the lateral movement amount of the vehicle 100 for avoiding a collision between the vehicle 100 and the obstacle 110 is relatively large.

The in-phase process refers to a process executed by the control unit 86 to steer the rear wheels 10R in the same direction as the steering direction of the front wheels 10F. The counter-phase process refers to a process executed by the control unit 86 to steer the rear wheels 10R in the opposite direction from the steering direction of the front wheels 10F.

The lateral force limit determining unit 85 determines whether the wheels 10F, 10R include a wheel receiving a lateral force greater than or equal to a limit value. The limit value refers to a value of lateral force acting on a wheel that is determined to cause a sideslip of the wheel during turning of the vehicle. The specific contents of this determination will be discussed later.

The control unit 86 performs the automatic turning control when the collision prediction time TMx is shorter than or equal to the determination prediction time TMxTh. In the automatic turning control, in order to avoid a collision between the vehicle 100 and the obstacle 110, the control unit 86 outputs a command for steering the front wheels 10F to the front wheel steering control unit 21 of the front wheel steering device 20, and outputs a command for steering the rear wheels 10R to the rear wheel steering control unit 31 of the rear wheel steering device 30.

Next, with reference to FIG. 2, a series of processes executed by the integrated controller 80 according to the present embodiment will be described. The series of processes is executed when the obstacle 110 exists in the path of the vehicle 100. When the obstacle 110 exists in the path of the moving vehicle 100, the integrated controller 80 repeatedly executes the series of processes.

First, in step S11, the time obtaining unit 81 of the integrated controller 80 obtains the collision prediction time TMx.

One example of the process for obtaining the collision prediction time TMx will now be described. A longitudinal travel distance Xr shown in FIG. 3 is the distance in the longitudinal direction from the vehicle 100 to the obstacle 110. The time obtaining unit 81 calculates an approach speed Vxr of the vehicle 100 toward the obstacle 110. In a case in which the obstacle 110 is a leading vehicle as shown in FIG. 3, the time obtaining unit 81 calculates, as the approach speed Vxr, a value obtained by subtracting the vehicle speed Vxt of the leading vehicle (the obstacle 110) from the vehicle speed Vxe of the vehicle 100. Thus, a positive value is obtained as the approach speed Vxr in a case in which the vehicle 100 is approaching the obstacle 110. Then, the time obtaining unit 81 divides the longitudinal travel distance Xr by the approach speed Vxr to obtain the collision prediction time TMx. The longitudinal travel distance Xr and the vehicle speed Vxt of the vehicle speed Vxt of the leading vehicle (the obstacle 110) are obtained based on monitoring results of the perimeter monitoring system 60.

Figure 2:
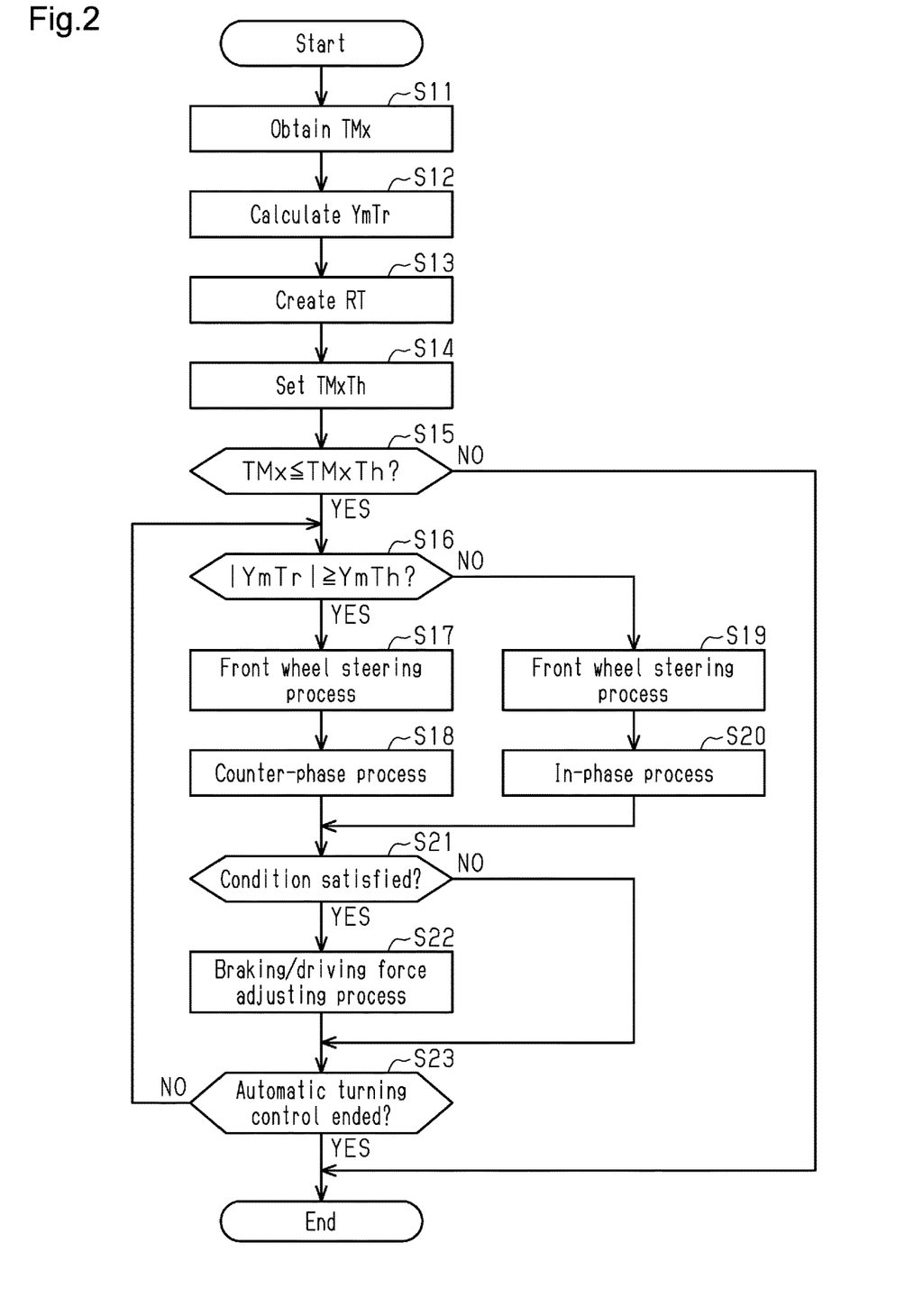
FIG. 2 is a flowchart showing a procedure of processes executed by the integrated controller of FIG. 1.

Referring to FIG. 2, when the obtainment of the collision prediction time TMx is completed, the integrated controller 80 advances the process to step S12. In step S12, the target lateral movement amount obtaining unit 83 of the integrated controller 80 obtains the target lateral movement amount YmTr.

One example of the process for obtaining the target lateral movement amount YmTr will now be described. In a case in which the obstacle 110 is not moving in the lateral direction, the target lateral movement amount obtaining unit 83 obtains the target lateral movement amount YmTr such that the target lateral movement amount YmTr increases as the width in the lateral direction of the obstacle 110 increases. The width in the lateral direction of the obstacle 110 is obtained based on the monitoring results of the perimeter monitoring system 60.

Figure 4:
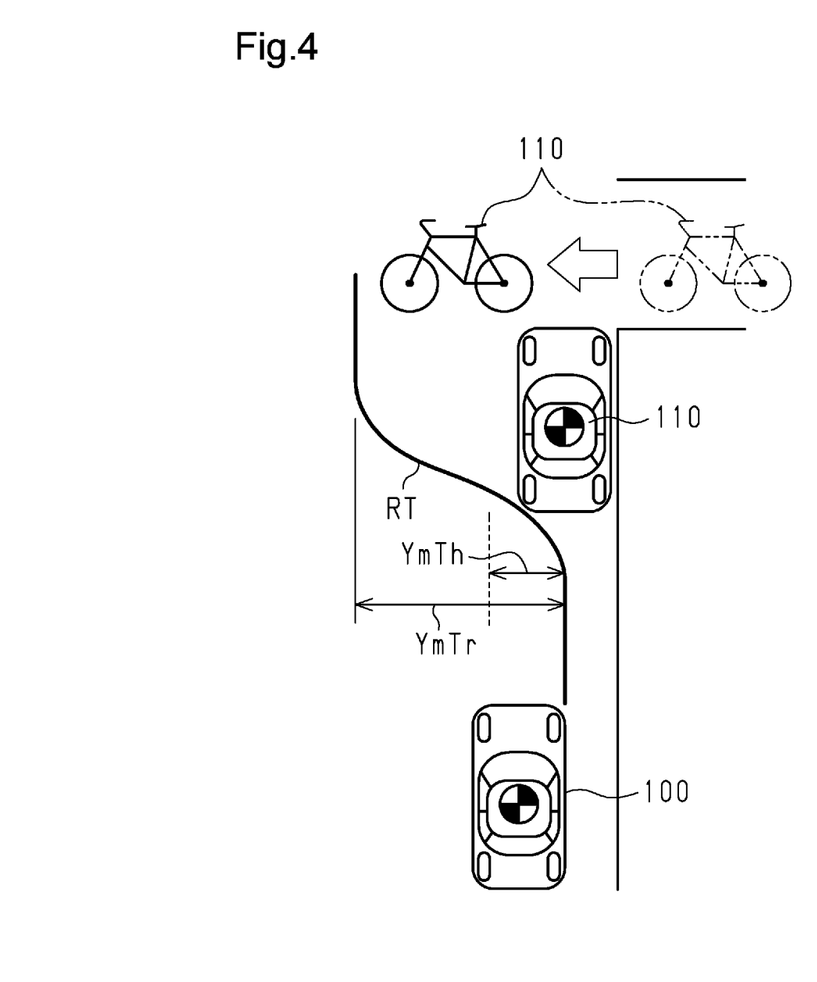
FIG. 4 is a schematic diagram showing a situation in which the vehicle turns to avoid a collision with the obstacle.

An example shown in FIG. 4 assumes that a bicycle, which is an example of the obstacle 110, is moving in the lateral direction. The target lateral movement amount obtaining unit 83 obtains the target lateral movement amount YmTr based on a relative current position, which is a position in the lateral direction of the obstacle 110, and a lateral movement amount predicted value. The relative current position is the current position of the obstacle 110 in relation to a reference position, which is the position of the vehicle 100 in the lateral direction. The lateral movement amount predicted value is a predicted value of the movement amount in the lateral direction of the obstacle 110 before the vehicle 100 reaches the current position of the obstacle 110. For example, the target lateral movement amount obtaining unit 83 obtains the target lateral movement amount YmTr such that the value of the target lateral movement amount YmTr increases as the difference between the relative current position and the reference position increases. Also, for example, the target lateral movement amount obtaining unit 83 obtains the target lateral movement amount YmTr such that the value of the target lateral movement amount YmTr increases as the lateral movement amount predicted value increases. The current relative position is obtained based on the monitoring results of the perimeter monitoring system 60. The lateral movement amount predicted value is obtained based on the approach speed Vxr, a moving speed Vye in the lateral direction of the vehicle 100, and a moving speed Vyt in the lateral direction of the obstacle 110.

Referring to FIG. 2, when the obtainment of the target lateral movement amount YmTr is completed, the integrated controller 80 advances the process to step S13. In step S13, the control unit 86 of the integrated controller 80 creates an avoidance route RT, which is a route of the vehicle 100 for avoiding a collision between the vehicle 100 and the obstacle 110. The avoidance route RT is a route that causes the movement amount in the lateral direction of the vehicle 100 to be the target lateral movement amount YmTr before the position in the longitudinal direction of the vehicle 100 agrees with the position in the longitudinal direction of the obstacle 110.

Subsequently, in step S14, the determination time setting unit 82 of the integrated controller 80 sets the determination prediction time TMxTh.

Figure 5:
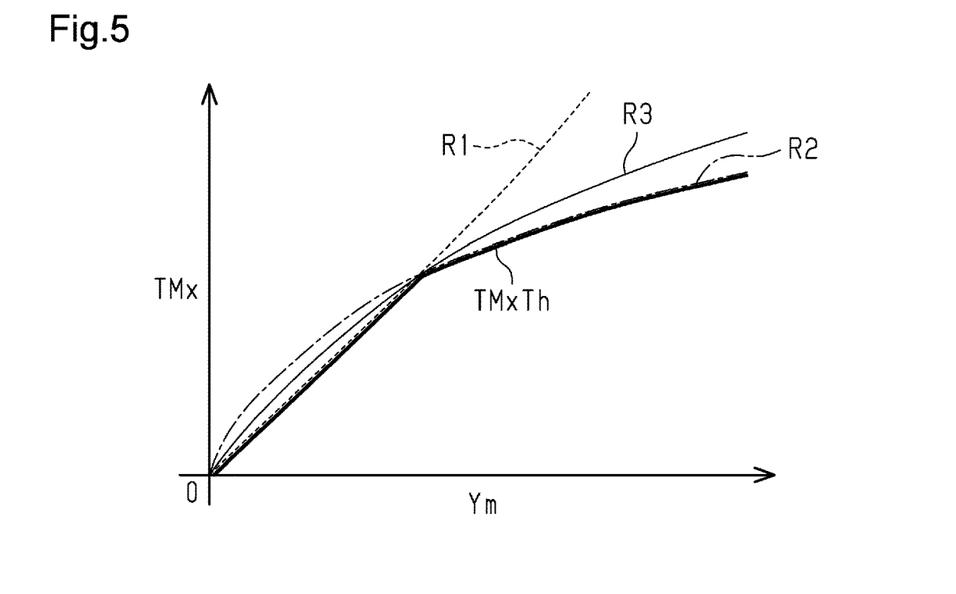
FIG. 5 is a map for setting determination prediction time based on a target lateral movement amount.
Figure 6:
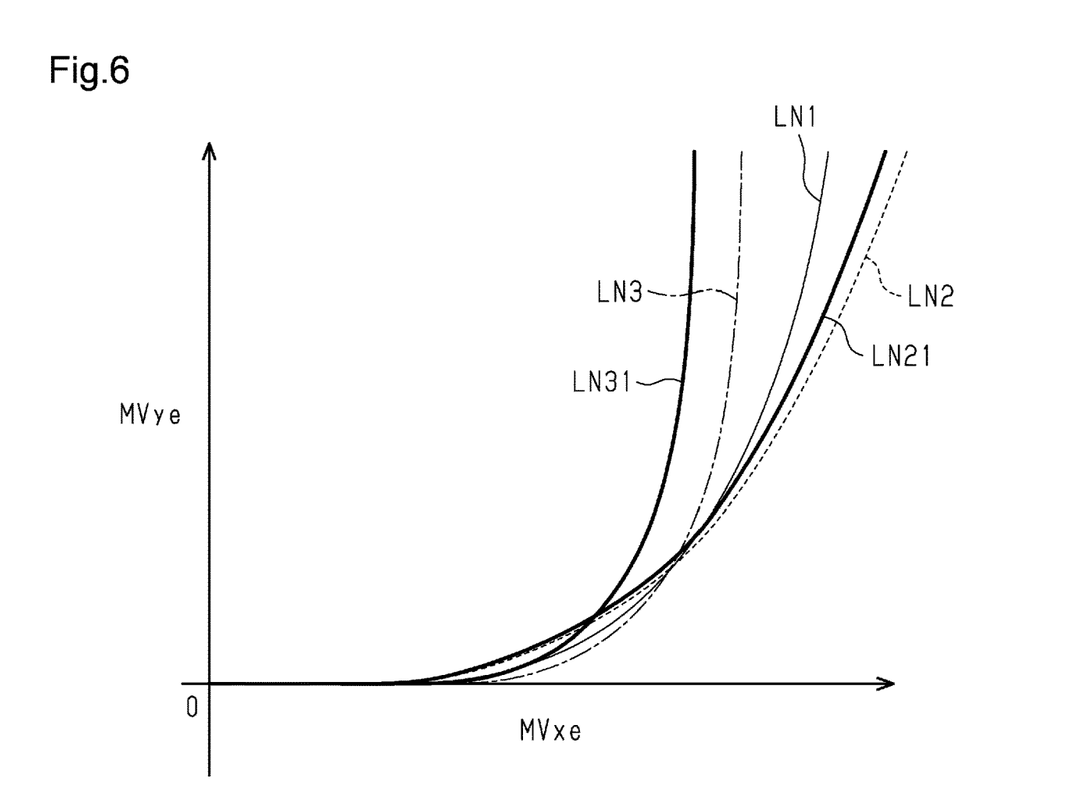
FIG. 6 is a graph showing a relationship between a movement amount in a longitudinal direction and a movement amount in a lateral direction of the vehicle when the vehicle turns.

With reference to FIGS. 5 and 6, one example of a process for setting the determination prediction time TMxTh will be described.

The determination time setting unit 82 sets the determination prediction time TMxTh based on an in-phase relationship R1, which is represented by a broken line in FIG. 5, and a counter-phase relationship R2, which is represented by a long-dash short-dash line in FIG. 5. The in-phase relationship R1 is a relationship between a lateral movement amount Ym, which is the movement amount in the lateral direction of the vehicle 100, and the collision prediction time TMx in a case in which the control unit 86 executes the in-phase process. The counter-phase relationship R2 is a relationship between the lateral movement amount Ym and the collision prediction time TMx in a case in which the control unit 86 executes the counter-phase process.

Based on the in-phase relationship R1, the determination time setting unit 82 calculates a first collision prediction time TMx1, which is the collision prediction time TMx corresponding to the target lateral movement amount YmTr. Based on the counter-phase relationship R2, the determination time setting unit 82 calculates a second collision prediction time TMx2, which is the collision prediction time TMx corresponding to the target lateral movement amount YmTr. The determination time setting unit 82 sets the determination prediction time TMxTh based on the shorter one of the first collision prediction time TMx1 and the second collision prediction time TMx2. In the present embodiment, the determination time setting unit 82 sets the determination prediction time TMxTh to the shorter one of the first collision prediction time TMx1 and the second collision prediction time TMx2.

When the lateral movement amount Ym is relatively small, the first collision prediction time TMx1, which is calculated based on the in-phase relationship R1, is shorter than the second collision prediction time TMx2, which is calculated based on the counter-phase relationship R2, as shown in FIG. 5. However, when the lateral movement amount Ym increases, the first collision prediction time TMx1, which is calculated based on the in-phase relationship R1, becomes longer than the second collision prediction time TMx2, which is calculated based on the counter-phase relationship R2.

Thus, when the target lateral movement amount YmTr is relatively small, the determination prediction time TMxTh is set to the first collision prediction time TMx1, which is calculated based on the in-phase relationship R1. In contrast, when the target lateral movement amount YmTr is relatively large, the determination prediction time TMxTh is set to the second collision prediction time TMx2, which is calculated based on the counter-phase relationship R2.

A relationship R3, which is represented by a thin solid line in FIG. 5, represents a relationship between the lateral movement amount Ym and the collision prediction time TMx in a case in which the rear wheels 10R are not steered during turning. That is, according to the present embodiment, the determination prediction time TMxTh is set to time shorter than a third collision prediction time TMx3, which is calculated based on the relationship R3. Thus, the collision prediction time TMx is less likely to become shorter than or equal to the determination prediction time TMxTh in the present embodiment than in a case in which the determination prediction time TMxTh is set to the third collision prediction time TMx3. Accordingly, the point in time at which the automatic turning control is started can be delayed.

In the present embodiment, the in-phase relationship R1 and the counter-phase relationship R2 are set as represented in FIG. 5 because the characteristics described below are taken into consideration.

FIG. 6 shows a relationship between a longitudinal movement amount MVxe, which is a movement amount in the longitudinal direction of the vehicle 100, and a lateral movement amount MVye, which is a movement amount in the lateral direction of the vehicle 100, in a case in which the vehicle 100 turns through a steering operation by the driver. The thin solid line LN1 represents a relationship between the longitudinal movement amount MVxe and the lateral movement amount MVye in a first pattern, in which the vehicle 100 is caused to turn automatically by steering the front wheels 10F. In the first pattern, the rear wheels 10R are not steered. The broken line LN2 represents a relationship between the longitudinal movement amount MVxe and the lateral movement amount MVye in a second pattern, in which the vehicle 100 is caused to turn automatically by steering the front wheels 10F and additionally steering the rear wheels 10R through the in-phase process. The long-dash short-dash line LN3 represents a relationship between the longitudinal movement amount MVxe and the lateral movement amount MVye in a third pattern, in which the vehicle 100 is caused to turn automatically by steering the front wheels 10F and additionally steering the rear wheels 10R through the counter-phase process.

In a case in which the longitudinal movement amount MVxe is relatively small, the lateral movement amount MVye in the second pattern is greater than the lateral movement amount MVye in the first pattern and the lateral movement amount MVye in third pattern. However, as the longitudinal movement amount MVxe increases, the lateral movement amount MVye in the second pattern becomes smaller than both the lateral movement amount MVye in the first pattern and the lateral movement amount MVye in the third pattern.

In a case in which the longitudinal movement amount MVxe is relatively small, the lateral movement amount MVye in the third pattern is smaller than both the lateral movement amount MVye in the first pattern and the lateral movement amount MVye in second pattern. However, as the longitudinal movement amount MVxe increases, the lateral movement amount MVye in the third pattern becomes greater than both the lateral movement amount MVye in the first pattern and the lateral movement amount MVye in the second pattern.

In the present embodiment, the in-phase relationship R1 and the counter-phase relationship R2 shown in FIG. 5 are set while taking the above-described characteristics into consideration.

Referring to FIG. 2, when the setting of the determination prediction time TMxTh is completed in step S14, the integrated controller 80 advances the process to step S15. In step S15, the control unit 86 of the integrated controller 80 determines whether the collision prediction time TMx, which is obtained in step S11, is shorter than or equal to the determination prediction time TMxTh, which is set in step S14. When the collision prediction time TMx is longer than the determination prediction time TMxTh (S15: NO), the integrated controller 80 temporarily suspends the series of processes. That is, the integrated controller 80 is yet to perform the automatic turning control.

When the collision prediction time TMx is shorter than or equal to the determination prediction time TMxTh (S15: YES), the integrated controller 80 starts the automatic turning control. That is, in step S16, the lateral movement amount determining unit 84 determines whether the target lateral movement amount YmTr is greater than or equal to the lateral movement amount determination value YmTh. The target lateral movement amount YmTr used in this determination is the target lateral movement amount YmTr at a point in time at which the collision prediction time TMx becomes shorter than or equal to the determination prediction time TMxTh. When the target lateral movement amount YmTr is greater than or equal to the lateral movement amount determination value YmTh (S16: YES), the integrated controller 80 advances the process to step S17.

In step S17, the control unit 86 of the integrated controller 80 executes a front wheel steering process, which outputs, to the front wheel steering control unit 21, a command for steering the front wheels 10F in order to avoid a collision between the vehicle 100 and the obstacle 110.

When receiving this command from the integrated controller 80, the front wheel steering control unit 21 controls the front wheel steering actuator 22 to steer the front wheels 10F.

Subsequently, in step S18, the control unit 86 executes a counter-phase process, which outputs, to the rear wheel steering control unit 31 of the rear wheel steering device 30, a command for steering the rear wheels 10R in a direction opposite to the steering direction of the front wheels 10F.

When receiving this command from the integrated controller 80, the rear wheel steering control unit 31 controls the rear wheel steering actuator 32, so as to steer the rear wheels 10R in a direction opposite to the steering direction of the front wheels 10F.

After executing the counter-phase process, the integrated controller 80 advances the process to step S21.

On the other hand, when the target lateral movement amount YmTr is less than the lateral movement amount determination value YmTh in step S16 (NO), the integrated controller 80 advances the process to step S19.

In step S19, the control unit 86 executes the front wheel steering process as in step S17.

When receiving this command from the integrated controller 80, the front wheel steering control unit 21 controls the front wheel steering actuator 22 to steer the front wheels 10F.

Subsequently, in step S20, the control unit 86 executes an in-phase process, which outputs, to the rear wheel steering control unit 31 of the rear wheel steering device 30, a command for steering the rear wheels 10R in the same direction as the steering direction of the front wheels 10F.

When receiving this command from the integrated controller 80, the rear wheel steering control unit 31 controls the rear wheel steering actuator 32, so as to steer the rear wheels 10R in the same direction as the steering direction of the front wheels 10F.

After executing the in-phase process, the integrated controller 80 advances the process to step S21.

In step S21, the lateral force limit determining unit 85 of the integrated controller 80 determines whether a condition for executing a braking/driving force adjusting process is satisfied. In the present embodiment, the lateral force limit determining unit 85 determines that the condition is satisfied when the wheels 10F, 10R do not include a wheel receiving a lateral force greater than or equal to the limit value. For example, the lateral force limit determining unit 85 determines that the lateral force is greater than or equal to the limit value when the following expression 1 is satisfied. In the expression 1, the symbol $\mu$ represents the friction coefficient of the road surface on which the vehicle 100 is traveling. The symbol W represents a vertical load applied to the wheel. The symbol Fy represents the lateral force applied to the wheel. The vertical load W refers to a load that is applied to the wheel by the vehicle body in the direction vertical to the road surface. For example, the vertical load acting on each of the wheels 10F and 10R is calculated based on the weight of the vehicle 100, the longitudinal acceleration Axe, and the lateral acceleration Aye.

$$(\mu \cdot W)^2 - Fy^2 < 0 \qquad \text{Expression 1}$$

Also, the lateral force Fy acting on the wheel is calculated based on the following expressions 2 and 3. The expression 2 is used to calculate the lateral force Fyf acting on each of the front wheels 10F. The expression 3 is used to calculate the lateral force Fyr acting on each of the rear wheels 10R. In the expressions 2 and 3, the symbol Kf represents the cornering power of the front wheels 10F, and Kr represents the cornering power of the rear wheels 10R. The symbol $\beta$ represents the vehicle slip angle at the center of gravity of the vehicle 100. The symbol Lf represents the distance between the center of gravity of the vehicle 100 and the front axle, and the symbol Lr represents the distance between the center of gravity of the vehicle 100 and the rear axle. The sum of Lf and Lr is equal to the wheelbase L of the vehicle 100. The symbol $\delta f$ represents the steered angle of the front wheels 10F, and the symbol $\delta r$ represents the steered angle of the rear wheels 10R. The steered angle $\delta f$ of the front wheels 10F will be sometimes referred to as the front wheel steered angle $\delta f$, and the steered angle $\delta r$ of the rear wheels 10R will be sometimes referred to as the rear wheel steered angle $\delta r$.

$$Fyf = -Kf \cdot \left(\beta + \frac{Lf}{Vxe} \cdot \gamma - \delta f\right) \quad \text{Expression 2}$$

$$Fyr = -Kf \cdot \left(\beta + \frac{Lr}{Vxe} \cdot \gamma - \delta r\right) \quad \text{Expression 3}$$

When the square of the lateral force Fy is greater than the square of the product of the friction coefficient $\mu$ of the road surface and the vertical load W, the wheel is likely to slide sideways. When the wheel is likely to slide sideways, increase in the braking force or the driving force applied to the wheel is not favorable to ensure stability of the vehicle behavior. In this regard, the lateral force limit determining unit 85 determines whether the wheels 10F, 10R include a wheel that satisfies the expression 1.

When it is determined that the wheels 10F, 10R include a wheel receiving a lateral force greater than or equal to the limit value (S21: NO), the condition is not satisfied. The integrated controller 80 thus advances the process to step S23. In this case, the control unit 86 does not execute the braking/driving force adjusting process. When it is not determined that the wheels 10F, 10R include a wheel receiving a lateral force greater than or equal to the limit value (S21: YES), the condition is satisfied. The integrated controller 80 thus advances the process to step S22.

In step S22, the control unit 86 executes the braking/driving force adjusting process. In the braking/driving force adjusting process according to the present embodiment, the control unit 86 outputs, to the braking control unit 41 of the braking device 40, a command for causing the braking force applied to the front wheel 10F located inside during turning to be greater than the braking force applied to the front wheel 10F located outside during turning, and a command for causing the braking force applied to the rear wheel 10R located inside during turning to be greater than the braking force applied to the rear wheel 10R located outside during turning. The specific contents of the braking/driving force adjusting process will be discussed later.

When receiving the commands, the braking control unit 41 controls the brake actuator 42 to cause the braking force applied to the front wheel 10F located inside during turning to be greater than the braking force applied to the front wheel 10F located outside during turning. Also, the braking control unit 41 controls the brake actuator 42 to cause the braking force applied to the rear wheel 10R located inside during turning to be greater than the braking force applied to the rear wheel 10R located outside during turning. This increases the yaw moment of the vehicle 100.

Subsequently, the control unit 86 determines whether an ending condition of the automatic turning control is satisfied in step S23. For example, the control unit 86 determines that the ending condition is satisfied when the lateral movement amount Ym of the vehicle 100 has reached the target lateral movement amount YmTr. The control unit 86 does not determine that the ending condition is satisfied when the lateral movement amount Ym of the vehicle 100 has not reached the target lateral movement amount YmTr. When the ending condition is not satisfied (S23: NO), the integrated controller 80 advances the process to step S16. That is, the execution of the automatic turning control is continued. On the other hand, when the ending condition is satisfied (S23: YES), the integrated controller 80 temporarily suspends the series of processes. That is, the automatic turning control is ended.

In the present embodiment, step S11 corresponds to the time obtaining process, which obtains the collision prediction time TMx in a case in which the vehicle 100 is approaching the obstacle 110. Step S16 corresponds to the determining process, which determines whether the target lateral movement amount YmTr is greater than or equal to the lateral movement amount determination value YmTh. Steps S17, S18 correspond to the counter-phase automatic turning process, which, in order to avoid a collision between the vehicle 100 and the obstacle 110, outputs a command for steering the front wheels 10F to the front wheel steering device 20, and outputs a command for steering the rear wheels 10R in a direction opposite to the steering direction of the front wheels 10F to the rear wheel steering device 30. Further, steps S19, S20 may correspond to the in-phase automatic turning process, which, in order to avoid a collision between the vehicle 100 and the obstacle 110, outputs a command for steering the front wheels 10F to the front wheel steering device 20, and outputs a command for steering the rear wheels 10R in the same direction as the steering direction of the front wheels 10F to the rear wheel steering device 30.

Next, one example of the in-phase process will be described.

In the in-phase process, the control unit 86 calculates a rear wheel steered angle command value $\delta rtgt$, which is a command value of the steered angle of the rear wheels 10R. Then, the control unit 86 outputs, to the rear wheel steering control unit 31, the rear wheel steered angle command value $\delta rtgt$ as a command for steering the rear wheels 10R in the same direction as the steering direction of the front wheels 10F.

The control unit 86 calculates the rear wheel steered angle command value $\delta rtgt$, for example, based on the following expressions 4 and 5. That is, the control unit 86 calculates the rear wheel steered angle command value $\delta rtgt$ based on the vehicle speed Vxe, the yaw rate $\gamma$, the vehicle slip angle $\beta$, the front wheel steered angle $\delta f$, and the rear wheel steered angle $\delta r$.

$$Fytgt = Fyf + Fyr \quad \text{Expression 4}$$

$$\delta rtgt = \frac{1}{Kr} \cdot \left\{Fytgt + Kf\left(\beta + \frac{Lf}{Vxe} \cdot \gamma - \delta f\right)\right\} + \beta - \frac{Lr}{Vxe} \cdot \gamma \quad \text{Expression 5}$$

Next, one example of the counter-phase process will be described.

In the counter-phase process, the control unit 86 calculates the rear wheel steered angle command value δrtgt. Then, the control unit 86 outputs, to the rear wheel steering control unit 31, the rear wheel steered angle command value δrtgt as a command for steering the rear wheels 10R in the direction opposite to the steering direction of the front wheels 10F.

The control unit 86 calculates the rear wheel steered angle command value δrtgt, for example, based on the following expression 6, 7, and 8. In the expressions 6 to 8, the symbol Gin1 represents a gain that is set from the specifications of the vehicle 100, and the symbol γtgt represents a target value of the yaw rate γ of the vehicle 100 when the counter-phase process is executed. That is, the symbol γtgt is a yaw rate target value. The control unit 86 calculates the rear wheel steered angle command value δrtgt based on the vehicle speed Vxe, the vehicle slip angle β, the front wheel steered angle δf, and the rear wheel steered angle δr.

$$\gamma tgt = Gin1 \cdot \frac{1}{1 + SF \cdot Vxe^2} \cdot \frac{Vxe}{L} \cdot \delta f \quad \text{Expression 6}$$

$$\frac{1}{Vxe} \cdot (Kf \cdot Lf^2 + Kr \cdot Lr^2) \cdot \gamma tgt + (Kf \cdot Lf - Kr \cdot Lr) \cdot \beta = \quad \text{Expression 7}$$

$$Kf \cdot Lf \cdot \delta f - Kr \cdot Lr \cdot \delta r$$

$$\delta rtgt = \frac{1}{Kr \cdot Lr} \cdot \Big\{ Kf \cdot Lf \cdot \delta f - \quad \text{Expression 8}$$

$$\frac{1}{Vxe} \cdot (Kf \cdot Lf^2 + Kr \cdot Lr^2) \cdot \gamma tgt - (Kf \cdot Lf - Kr \cdot Lr) \cdot \beta \Big\}$$

Next, one example of the braking/driving force adjusting process will be described.

The control unit 86 calculates braking force command values Fxf*, Fxr* in the braking/driving force adjusting process. The control unit 86 outputs, to the braking control unit 41, the braking force command values Fxf* corresponding to the respective front wheels 10F as command values that cause the braking force applied to the front wheel 10F located inside during turning to be greater than the braking force applied to the front wheel 10F located outside during turning. Also, the control unit 86 outputs, to the braking control unit 41, the braking force command values Fxr* corresponding to the respective rear wheels 10R as command values that cause the braking force applied to the rear wheel 10R located inside during turning to be greater than the braking force applied to the rear wheel 10R located outside during turning.

When the symbol * in the braking force command value Fxf* is replaced by the symbol 1, the braking force command value Fxfl is a command value of the braking force applied to the left front wheel 10F. When the symbol * in the braking force command value Fxf* is replaced by the symbol r, the braking force command value Fxfr is a command value of the braking force applied to the right front wheel 10F. When the symbol * in the braking force command value Fxr* is replaced by the symbol 1, the braking force command value Fxrl is a command value of the braking force applied to the left rear wheel 10R. When the symbol * in the braking force command value Fxr* is replaced by the symbol r, the braking force command value Fxrr is a command value of the braking force applied to the right rear wheel 10R.

The control unit 86 calculates the braking force command values Fxf*, Fxr* based on the following expressions 9, 10, 11, 12, 13, 14, and 15. In the expressions 9 to 15, the symbol γtgt represents a yaw rate target value used when the braking/driving force adjusting process is executed, and the symbols Tdf* and Tdr* represent tread bases. That is, the symbol Tdfl represents a tread base for the left front wheel 10F, symbol Tdfr represents a tread base for the right front wheel 10F, symbol Tdrl represents a tread base for the left rear wheel 10R, and symbol Tdrr represents a tread base for the right rear wheel 10R.

$$\gamma tgt = Gin1 \cdot \frac{1}{1 + SF \cdot Vxe^2} \cdot \frac{Vxe}{L} \cdot \delta f \quad \text{Expression 9}$$

$$Mzbrk = \frac{2Kf \cdot Kr}{Kf + Kr} \cdot \Big\{ (1 + SF \cdot Vxe^2) \cdot \frac{L^2}{Vxe} \cdot \gamma tgt - L(\delta f - \delta r) \Big\} \quad \text{Expression 10}$$

$$|Fxf * \lim| = \sqrt{(\mu \cdot W)^2 - Fyf*^2} \quad \text{Expression 11}$$

$$|Fxr * \lim| = \sqrt{(\mu \cdot W)^2 - Fyr*^2} \quad \text{Expression 12}$$

$$\alpha = \frac{Fxf * \lim}{Fxf * \lim + Fxr * \lim} \quad \text{Expression 13}$$

$$Fxf *= \text{Min}\Big( Fyf * \lim, \frac{\alpha}{Tdf *} \cdot Mzbrk \Big) \quad \text{Expression 14}$$

$$Fxr *= \text{Min}\Big( Fyr * \lim, \frac{(1-\alpha)}{Tdr *} \cdot Mzbrk \Big) \quad \text{Expression 15}$$

FIG. 6 shows a relationship between the longitudinal movement amount MVxe and the lateral movement amount MVye in a case in which the vehicle 100 turns through a steering operation by the driver. The thick solid line LN21 represents a relationship between the longitudinal movement amount MVxe and the lateral movement amount MVye in a fourth pattern, in which the front wheels 10F are steered and the rear wheels 10R are steered through the in-phase process, and the braking/driving force adjusting process is executed. The thick solid line LN31 represents a relationship between the longitudinal movement amount MVxe and the lateral movement amount MVye in a fifth pattern, in which the front wheels 10F are steered and the rear wheels 10R are steered through the counter-phase process, and the braking/driving force adjusting process is executed.

When the second pattern and the fourth pattern are compared, the fourth pattern increases the lateral movement amount MVye by a greater amount than the second pattern because of the execution of the braking/driving force adjusting process. Likewise, when the third pattern and the fifth pattern are compared, the fifth pattern increases the lateral movement amount MVye by a greater amount than the third pattern because of the execution of the braking/driving force adjusting process.

An operation of the present embodiment will now be described.

First, an operation of the execution of the counter-phase process will be described with reference to FIG. 7.

When the collision prediction time TMx becomes shorter than or equal to the determination prediction time TMxTh, with the vehicle 100 approaching the obstacle 110, the automatic turning control is started. Then, as shown in sections (a), (b), and (c) in FIG. 7, the front wheel steering process starts being executed at a point in time t11. Accordingly, the front wheels 10F are steered in order to avoid a collision between the vehicle 100 and the obstacle 110. For example, the vehicle 100 is caused to turn along the avoidance route RT shown in FIG. 4. In this case, the front wheels 10F are steered such that the vehicle 100 turns left. Then, at a point in time t13 during turning, the turning direction of the vehicle 100 is changed from the leftward direction to the rightward direction. That is, the steering direction of the front wheels 10F is switched at the point in time t13. Thereafter, since a collision between the vehicle 100 and the obstacle 110 has been avoided, the automatic turning control is ended at a point in time t15.

Figure 7:
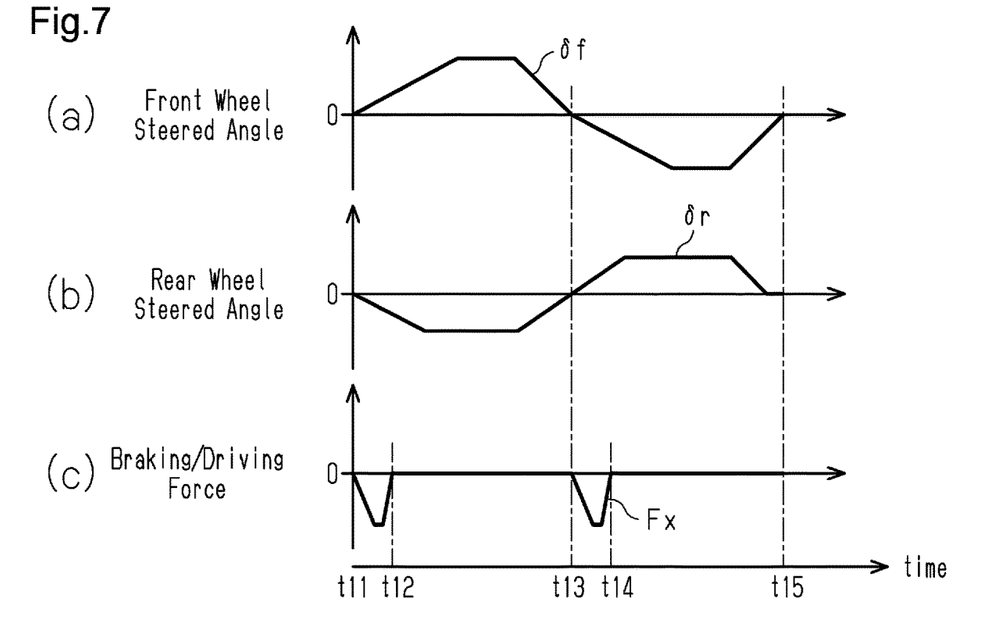
FIG. 7 is a timing diagram showing changes in a front wheel steered angle, a rear wheel steered angle, and a braking/driving force when automatic turning control is performed.

In the example shown in FIG. 7, the counter-phase process is executed since the target lateral movement amount YmTr is greater than or equal to the lateral movement amount determination value YmTh. When the counter-phase process is executed, the rear wheels 10R are steered in the direction opposite to the steering direction of the front wheels 10F. This increases the lateral movement amount Ym of the vehicle 100 as compared to a case in which the rear wheels 10R are not steered or a case in which steering of the rear wheels 10R is controlled through the in-phase process.

Since the lateral movement amount Ym of the vehicle 100 in the automatic turning control is increased in the above-described manner, the determination prediction time TMxTh can be set to shorter time, accordingly. This allows the automatic turning control to be executed less frequently.

In the example shown in FIG. 7, the steering direction of the front wheels 10F is switched at the point in time t13. Thus, the steering direction of the rear wheels 10R is also switched at the point in time t13.

In the present embodiment, the braking/driving force adjusting process is executed in the automatic turning control. That is, during the period from the point in time t11 to the point in time t12, the wheels 10F, 10R are determined not to include a wheel receiving a lateral force greater than or equal to the limit value. Therefore, the difference of the braking force between the left wheel and the right wheel is adjusted through the execution of the braking/driving force adjusting process. This increases the lateral movement amount Ym of the vehicle 100 as compared to a case in which the braking/driving force adjusting process is not executed.

However, the wheels 10F, 10R are determined to include a wheel receiving a lateral force greater than or equal to the limit value at the point in time t12. The braking/driving force adjusting process is thus ended. In this manner, the braking/driving force adjusting process is not executed when there is a wheel that is likely to slide sideways. This ensures the stability of the vehicle behavior during turning.

In the example shown in FIG. 7, the wheels 10F, 10R stop being determined to include a wheel receiving a lateral force greater than or equal to the limit value at the point in time t13, at which the steering direction of the front wheels 10F is switched. Accordingly, the braking/driving force adjusting process is executed again. Even in this case, the wheels 10F, 10R are determined to include a wheel receiving a lateral force greater than or equal to the limit value at the point in time t14, so that the braking/driving force adjusting process is ended.

Next, an operation of the execution of the in-phase process will be described with reference to FIG. 8.

When the collision prediction time TMx becomes shorter than or equal to the determination prediction time TMxTh, with the vehicle 100 approaching the obstacle 110, the automatic turning control is started. Then, as shown in sections (a), (b), and (c) in FIG. 8, the front wheel steering process starts being executed at a point in time t21. Accordingly, the front wheels 10F are steered in order to avoid a collision between the vehicle 100 and the obstacle 110. For example, the vehicle 100 is caused to turn along the avoidance route RT shown in FIG. 4. In this case, the front wheels 10F are steered such that the vehicle 100 turns left. Then, at a point in time t23 during turning, the turning direction of the vehicle 100 is changed from the leftward direction to the rightward direction. That is, the steering direction of the front wheels 10F is switched at the point in time t23. Thereafter, since a collision between the vehicle 100 and the obstacle 110 has been avoided, the automatic turning control is ended at a point in time t25.

Figure 8:
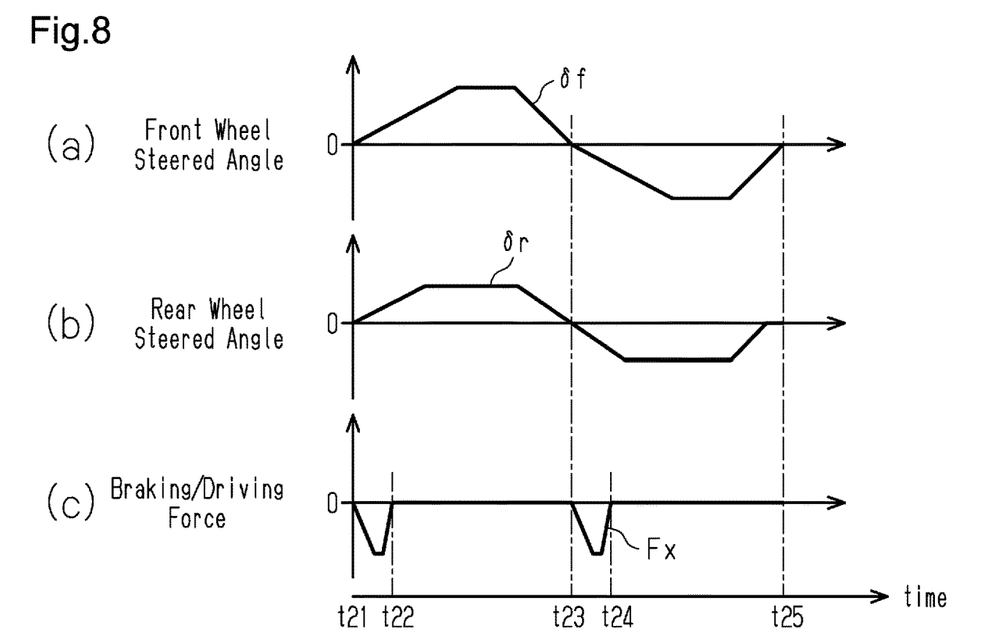
FIG. 8 is a timing diagram showing changes in the front wheel steered angle, the rear wheel steered angle, and the braking/driving force when the automatic turning control is performed.

In the example shown in FIG. 8, the in-phase process is executed since the target lateral movement amount YmTr is less than the lateral movement amount determination value YmTh. When the in-phase process is executed, the rear wheels 10R are steered in the same direction as the steering direction of the front wheels 10F. It has been known that the stability of the behavior of the vehicle 100 is higher when the steering direction of the rear wheels 10R is the same as the steering direction of the front wheels 10F than when the steering direction of the rear wheels 10R is opposite to the steering direction of the front wheels 10F. Thus, in a case in which the lateral movement amount of the of the vehicle 100 is relatively small during the automatic turning control, the in-phase process is executed instead of the counter-phase process. This allows the vehicle 100 to avoid a collision with the obstacle 110, while ensuring the stability of the behavior of the vehicle 100.

In the example shown in FIG. 8, the steering direction of the front wheels 10F is switched at the point in time t23. Thus, the steering direction of the rear wheels 10R is also switched at the point in time t23.

In the present embodiment, the braking/driving force adjusting process is executed in the automatic turning control. That is, during the period from the point in time t21 to the point in time t22, the wheels 10F, 10R are determined not to include a wheel receiving a lateral force greater than or equal to the limit value. Therefore, the difference of the braking force between the left wheel and the right wheel is adjusted through the execution of the braking/driving force adjusting process. This increases the lateral movement amount Ym of the vehicle 100 as compared to a case in which the braking/driving force adjusting process is not executed.

However, the wheels 10F, 10R are determined to include a wheel receiving a lateral force greater than or equal to the limit value at the point in time t22. The braking/driving force adjusting process is thus ended. In this manner, the braking/driving force adjusting process is not executed when there is a wheel that is likely to slide sideways. This ensures the stability of the vehicle behavior during turning.

In the example shown in FIG. 8, the wheels 10F, 10R stop being determined to include a wheel receiving a lateral force greater than or equal to the limit value at the point in time t23, at which the steering direction of the front wheels 10F is switched. Accordingly, the braking/driving force adjusting process is executed again. Even in this case, the wheels 10F, 10R are determined to include a wheel receiving a lateral force greater than or equal to the limit value at the point in time t24, so that the braking/driving force adjusting process is ended.

The present embodiment further has the following advantages.

A comparative example assumes that the determination prediction time TMxTh is set to the first collision prediction time TMx1, which corresponds to the target lateral movement amount YmTr calculated based on the in-phase relationship R1 shown in FIG. 5. In this case, the determination prediction time TMxTh is increased when the target lateral movement amount YmTr is relatively large as compared to a case in which the determination prediction time TMxTh is set to the second collision prediction time TMx2, which corresponds to the target lateral movement amount YmTr calculated based on the counter-phase relationship R2 shown in FIG. 5. In this manner, the automatic turning control is likely to be executed when the target lateral movement amount YmTr is relatively large in a case in which the determination prediction time TMxTh is set to the first collision prediction time TMx1.

In contrast, another comparative example assumes that the determination prediction time TMxTh is set to the second collision prediction time TMx2 calculated based on the counter-phase relationship R2. In this case, the determination prediction time TMxTh is increased when the target lateral movement amount YmTr is relatively small as compared to a case in which the determination prediction time TMxTh is set to the first collision prediction time TMx1 calculated based on the in-phase relationship R1. In this manner, the automatic turning control is likely to be executed when the target lateral movement amount YmTr is relatively small in a case in which the determination prediction time TMxTh is set to the second collision prediction time TMx2.

In this regard, the present embodiment sets the determination prediction time TMxTh to the shorter one of the first collision prediction time TMx1, which is calculated based on the in-phase relationship R1, and the second collision prediction time TMx2, which is calculated based on the counter-phase relationship R2. This allows the automatic turning control to be executed less frequently regardless of the value of the target lateral movement amount YmTr.

The above-described embodiment may be modified as follows. The above-described embodiment and the following modifications can be combined as long as the combined modifications remain technically consistent with each other.

In the above-described embodiment, a wheel that satisfies the expression 1 is determined to be receiving a lateral force greater than or equal to the limit value. However, the present disclosure is not limited to this. For example, when a yaw rate that is calculated based on the lateral acceleration Aye is used as a yaw rate target value, the vehicle 100 is likely to slide sideways if the difference between the yaw rate target value and the yaw rate γ is greater than or equal to a threshold. Thus, the wheels 10F, 10R of the vehicle 100 may be determined to include a wheel receiving a lateral force greater than or equal to the limit value when the difference between the yaw rate target value and the yaw rate γ is greater than or equal to the threshold.

The braking/driving force adjusting process does not necessarily need to adjust the difference in braking force between the right rear wheel 10R and the left rear wheel 10R if the difference in braking force between the right front wheel 10F and the left front wheel 10F is adjusted.

The braking/driving force adjusting process does not necessarily need to adjust the difference in braking force between the right front wheel 10F and the left front wheel 10F if the difference in braking force between the right rear wheel 10R and the left rear wheel 10R is adjusted.

When the braking/driving force adjusting process adjusts the braking force applied to the wheels 10F, 10R, the braking force applied to the entire vehicle may be increased, so that the vehicle 100 is decelerated. Thus, during the execution of the braking/driving force adjusting process, the driving device 50 may be activated to increase the driving force of the vehicle 100 in order to compensate for the deceleration of the vehicle 100 that accompanies the execution of the braking/driving force adjusting process. This limits the deceleration of the vehicle 100 that accompanies the execution of the braking/driving force adjusting process.

In a case in which the driving device 50 has a function of adjusting the difference in the driving force applied to a right wheel and the driving force applied to a left wheel, the braking/driving force adjusting process may adjust the difference between the driving force applied to the right wheel and the driving force applied to the left wheel, so as to increase the yaw moment of the vehicle 100.

The braking/driving force adjusting process does not necessarily need to be executed during the automatic turning control.

As long as the determination prediction time TMxTh is set to the shorter one of the first collision prediction time TMx1, which is calculated based on the in-phase relationship R1, and the second collision prediction time TMx2, which is calculated based on the counter-phase relationship R2, the determination prediction time TMxTh may be set by a method different from the method according to the above-described embodiment. For example, the shorter one of the first collision prediction time TMx1 and the second collision prediction time TMx2 may be used as a reference value, and the determination prediction time TMxTh may be set to the product of the reference value and a predetermined gain.

The determination prediction time TMxTh may be set based only on the first collision prediction time TMx1 calculated based on the in-phase relationship R1.

Also, the determination prediction time TMxTh may be set based only on the second collision prediction time TMx2 calculated based on the counter-phase relationship R2.

The automatic turning control may execute the counter-phase process regardless whether the target lateral movement amount is greater than or equal to the lateral movement amount determination value.

The turning controller may include the integrated controller 80 and the rear wheel steering control unit 31. The turning controller may further include the braking control unit 41 and the driving control unit 51.

The above-described vehicle may include only one front wheel 10F.

The above-described vehicle may include only one rear wheel 10R.

In this specification, "at least one of A and B" should be understood to mean "only A, only B, or both A and B."

Various changes in form and details may be made to the examples above without departing from the spirit and scope of the claims and their equivalents. The examples are for the sake of description only, and not for purposes of limit. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A turning controller for a vehicle, the vehicle including wheels including a front wheel and a rear wheel, a front wheel steering device configured to adjust a steered angle of the front wheel, and a rear wheel steering device configured to adjust a steered angle of the rear wheel, the turning controller comprising processing circuitry configured to execute:

a time obtaining process that obtains collision prediction time, the collision prediction time being a predicted value of an amount of time before the vehicle collides with an obstacle in a case in which the vehicle is approaching the obstacle;

a lateral movement amount determining process that determines whether a target lateral movement amount is greater than or equal to a lateral movement amount determination value, the target lateral movement amount being a movement amount in a lateral direction of the vehicle required to avoid a collision between the vehicle and the obstacle; and an automatic turning process in a case in which the collision prediction time is shorter than or equal to a determination prediction time, the automatic turning process outputting a command for steering the front wheel to the front wheel steering device and outputting a command for steering the rear wheel to the rear wheel steering device, in order to avoid a collision between the vehicle and the obstacle, wherein the processing circuitry is configured to execute a counter-phase process in the automatic turning process in a case in which the target lateral movement amount is determined to be greater than or equal to the lateral movement amount determination value, the counter-phase process outputting a command for steering the rear wheel in a direction opposite to a steering direction of the front wheel to the rear wheel steering device.

2. The turning controller for the vehicle according to claim 1, wherein the processing circuitry is configured to execute an in-phase process in the automatic turning process in a case in which the target lateral movement amount is not determined to be greater than or equal to the lateral movement amount determination value, the in-phase process outputting a command for steering the rear wheel in a same direction as the steering direction of the front wheel to the rear wheel steering device.

3. The turning controller for the vehicle according to claim 2, wherein a relationship between the collision prediction time and a vehicle lateral movement amount in a case in which the processing circuitry executes the in-phase process is an in-phase relationship, the vehicle lateral movement amount being a movement amount in the lateral direction of the vehicle, a relationship between the collision prediction time and the vehicle lateral movement amount in a case in which the processing circuitry executes the counter-phase process is a counter-phase relationship, the processing circuitry is configured to further execute:
a determination time setting process that sets the determination prediction time based on the in-phase relationship and the counter-phase relationship; and
a target lateral movement amount obtaining process that obtains the target lateral movement amount, the in-phase relationship and the counter-phase relationship are set such that:
in a case in which the vehicle lateral movement amount is relatively small, a first collision prediction time is shorter than a second collision prediction time, the first collision prediction time being the collision prediction time that corresponds to the target lateral movement amount calculated based on the in-phase relationship, and the second collision prediction time being the collision prediction time that corresponds to the target lateral movement amount calculated based on the counter-phase relationship; and in a case in which the vehicle lateral movement amount is relatively large, the first collision prediction time is longer than second collision prediction time, and the determination time setting process includes setting the determination prediction time based on shorter one of the first collision prediction time and the second collision prediction time.

4. The turning controller for the vehicle according to claim 1, wherein the processing circuitry is configured to execute a lateral force limit determining process that determines whether the wheels include a wheel receiving a lateral force greater than or equal to a limit value, and the automatic turning process includes increasing a yaw moment of the vehicle by adjusting at least one of a braking force and a driving force applied to the wheels, in a case in which the wheels are not determined to include a wheel receiving a lateral force greater than or equal to the limit value.

5. A non-transitory computer readable medium storing a turning control program executed by a controller for a vehicle, the vehicle including wheels including a front wheel and a rear wheel, a front wheel steering device configured to adjust a steered angle of the front wheel, and a rear wheel steering device configured to adjust a steered angle of the rear wheel, the turning control program being configured to cause the controller to execute:

a time obtaining process that obtains collision prediction time, the collision prediction time being a predicted value of an amount of time before the vehicle collides with an obstacle in a case in which the vehicle is approaching the obstacle;

a determining process that determines whether a target lateral movement amount is greater than or equal to a lateral movement amount determination value, the target lateral movement amount being a movement amount in a lateral direction of the vehicle required to avoid a collision between the vehicle and the obstacle; and a counter-phase automatic turning process that, in a case in which the collision prediction time is shorter than or equal to a determination prediction time and the target lateral movement amount is determined to be greater than or equal to the lateral movement amount determination value, outputs a command for steering the front wheel to the front wheel steering device and outputs a command for steering the rear wheel in a direction opposite to a steering direction of the front wheel to the rear wheel steering device, in order to avoid a collision between the vehicle and the obstacle.

6. A turning control method for a vehicle, the vehicle including wheels including a front wheel and a rear wheel, a front wheel steering device configured to adjust a steered angle of the front wheel, and a rear wheel steering device configured to adjust a steered angle of the rear wheel, the turning control method comprising:

obtaining collision prediction time, the collision prediction time being a predicted value of an amount of time before the vehicle collides with an obstacle in a case in which the vehicle is approaching the obstacle;

determining whether a target lateral movement amount is greater than or equal to a lateral movement amount determination value, the target lateral movement amount being a movement amount in a lateral direction of the vehicle required to avoid a collision between the vehicle and the obstacle; and in a case in which the collision prediction time is shorter than or equal to a determination prediction time and the target lateral movement amount is determined to be greater than or equal to the lateral movement amount determination value, outputting a command for steering the front wheel to the front wheel steering device and outputting a command for steering the rear wheel in a direction opposite to a steering direction of the front wheel to the rear wheel steering device, in order to avoid a collision between the vehicle and the obstacle.

* * * * *

UNITED STATES PATENT AND TRADEMARK OFFICE
CERTIFICATE OF CORRECTION

| | |
|---|---|
| PATENT NO. | : 11,820,367 B2 |
| APPLICATION NO. | : 17/476100 |
| DATED | : November 21, 2023 |
| INVENTOR(S) | : Yosuke Omori |

It is certified that error appears in the above-identified patent and that said Letters Patent is hereby corrected as shown below:

On the Title Page

Please add:
-- (73) Assignee: ADVICS CO., LTD.
Kariya-shi, Aichi-ken, JAPAN
DENSO CORPORATION
Kariya-City, Aichi-Pref., JAPAN
AISIN CORPORATION
Kariya-shi, Aichi-ken, JAPAN
JTEKT CORPORATION
Kariya-shi, Aichi-ken, JAPAN --

Signed and Sealed this
First Day of October, 2024

Katherine Kelly Vidal
*Director of the United States Patent and Trademark Office*